J. KAPLAN.
BELT TIGHTENER AND SPREADER.
APPLICATION FILED JAN. 4, 1917.
1,227,541.
Patented May 22, 1917.
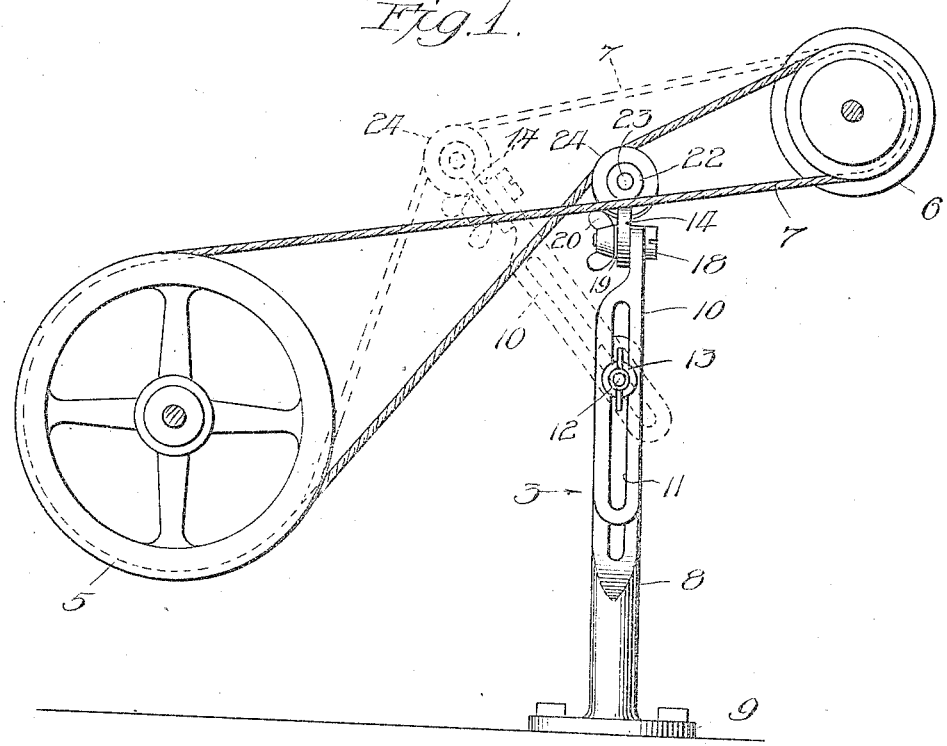
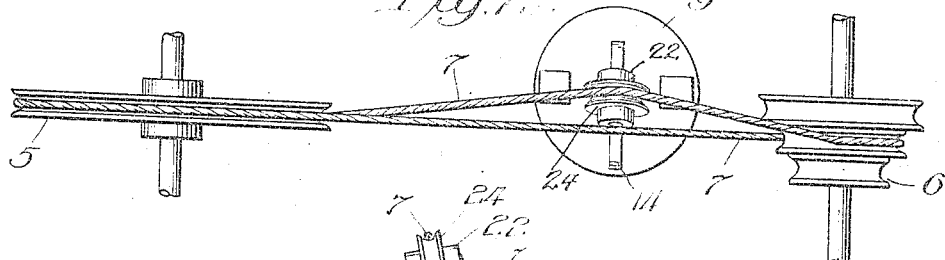
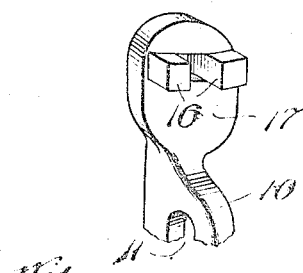
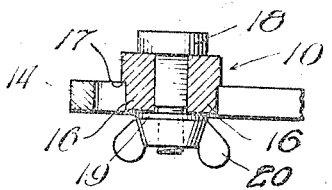
Inventor:
Jacob Kaplan,
by
Witness:
Harry S. Gaither

UNITED STATES PATENT OFFICE.

JACOB KAPLAN, OF CHICAGO, ILLINOIS, ASSIGNOR TO A. C. K. BELTING CO., OF CHICAGO, ILLINOIS, A CORPORATION OF ILLINOIS.

BELT TIGHTENER AND SPREADER.

1,227,541.

Specification of Letters Patent.

Patented May 22, 1917.

Application filed January 4, 1917. Serial No. 140,493.

*To all whom it may concern:*

Be it known that I, JACOB KAPLAN, a citizen of the United States, and a resident of Chicago, county of Cook, and State of Illinois, have invented certain new and useful Improvements in Belt Tighteners and Spreaders, of which the following is declared to be a full, clear, and exact description.

This invention relates to belt tighteners and spreaders, and it has been particularly designed for use in connection with twisted belts, although it is well adapted for use in connection with straight belts. Sewing machine belts and belts for other machines are apt to stretch considerably from use and wear, and heretofore it has been customary to cut a piece off the belt when it has stretched and to reconnect the ends. It has also been proposed to use belts made of rope, but there is considerable objection to cutting off the ends of rope belts and recoupling the ends thereof. The present invention is designed to provide a belt tightener, which may be readily adjusted to take up the slack in the belt, and which may also be adjusted to prevent the one part of the belt from rubbing against the other where the belt crosses itself. With the use of the present device, it is unnecessary to cut off pieces of the belt when it stretches, but the slack may be taken up by adjusting the belt tightener. The invention consists, therefore, in the several novel features of construction, arrangement and combination of parts hereinafter fully set forth and particularly defined in the claims.

The invention is clearly illustrated in the accompanying drawing, in which Figure 1, is a side elevation of a belt tightener, embodying a simple form of the present invention, and showing the same applied to a twisted belt of a sewing machine driving apparatus; Fig. 2, is a plan of the parts seen in Fig. 1; Fig. 3, is a view of the device looking in the direction of the arrow 3, in Fig. 1; Fig. 4, is a perspective view of a fragment of the upper end of a certain arm; and Fig. 5, is a section taken on line 5—5 of Fig. 3.

Referring to said drawing, the reference numeral 5, designates a driving pulley of a sewing machine driving mechanism, such as is usually employed in tailoring establishments, and 6, designates a coned pulley around which pulleys 5 and 6 is trained a twisted belt 7. In accordance with the common practice, the coned pulley is employed to drive the sewing machine (not shown) which is located upon a table above the pulleys.

The belt tightener comprises a lengthwise slotted standard 8, which is formed with a base 9, at its lower end, which may be bolted or otherwise secured to any supporting structure, as for instance the floor of the building, and 10, designates a supporting arm adjustably mounted upon the upper end of said standard 8. As shown, said supporting arm 10, has an elongated slot 11, formed therein, and a bolt 12, passes through the slots of the standard 8, and arm 10, and is provided with a thumb screw 13, upon its threaded end, by means of which the standard and arm may be rigidly clamped together against relative movement in any position of adjustment. The arm 10, may be set in alinement with the standard 8, if desired, or it may be set at an angle thereto, as shown in dotted lines in Fig. 1, to obtain certain features of adjustment.

Mounted upon the upper end of said arm, to move in a plane at right angles to the plane of said arm, is a pulley carrying head 14, which is formed with an arc shaped elongated slot 15, that receives two lugs 16, 16, which project outward from the face 17, of the arm 10. A screw or bolt 18, passes through a hole formed in the upper end of the arm 10, and extends between the lugs 16, and has a washer 19, and wing nut 20, upon its outer end, which wing nut may be tightened up to clamp the pulley carrying head 14 against the face 17, of the arm 10. Said head 14, is provided with a forked portion 22, having alined bearing apertures formed therein for the reception of the shaft 23, of the grooved pulley 24. The pulley may turn in a plane approximately parallel with the plane of the belt, but the head 14, may be shifted upon the lugs 16, to tilt the pulley out of a vertical plane, when desiring to obtain certain features of adjustment.

In use, the device is fastened to the floor, or other support, below or above the twisted belt, with the pulley 24, located in a plane to one side of the plane of the twisted belt, and preferably near the intersecting points of the belt. The belt is then placed upon the pulley 24, and the arm raised to put tension upon the belt; the belt carrying head 14, is adjusted upon its support so as to tilt the pulley 24, in such manner that any tendency for the belt to run out of the grooves of the pulleys is wholly eliminated. In other words, the pulley 24, is set so that a sidewise pull upon it by the belt, which might otherwise cause the belt to leave the groove of the pulley, is prevented because of the angle assumed by the pulley 24. When the belt becomes slack, the operator simply loosens the wing nut 13, raises the arm 10, until the slack is taken out of the belt and retightens the wing nut 13. Under certain conditions, it may be found advisable not only to raise the adjustable arm 10, but to swing it toward the larger pulley 5, and thereby take up more of the slack as it occurs.

It is to be noted that this belt tightener not only is capable of taking up the slack in twisted belts, but that it has a further function of holding the intersecting portions of the belt out of contact from each other, thereby preventing increased and unusual wear, which would otherwise occur; and where rope belts are used, it is practically impossible to obtain any length of usage of such belts unless they are prevented from rubbing at the intersecting points.

More or less variation of the exact details of construction shown and described is possible without departing from the spirit of this invention, and I desire, therefore, not to limit myself to the exact form of construction shown and described, but intend in the following claims to point out all the invention disclosed herein.

I claim as new, and desire to secure by Letters Patent:

1. A belt tightener, comprising a standard, an arm adjustably secured thereon, and movable both lengthwise of said standard and angularly with respect thereto in a plane approximately parallel with the belt, and a grooved pulley, over which a belt may run, supported by said standard.

2. A belt tightener, comprising a standard, an arm adjustably carried thereby, and movable lengthwise of the standard, and also angularly with respect thereto in a direction approximately parallel with the belt, a pulley supporting head, mounted upon said arm and adjustable in an arc of a circle transverse to the plane of the belt, and a grooved pulley journaled upon said head.

3. A belt tightener, comprising a standard, an arm adjustably mounted thereon, and capable of being moved lengthwise of the standard, and also in an arc of a circle in a plane approximately parallel with the plane of the belt, a pulley carrying head mounted upon said arm to move in a plane approximately at right angles to the plane of movement of said arm, and a grooved pulley journaled upon said head, said pulley being adapted for engagement with the belt.

4. A belt tightener, comprising a standard, an adjustable arm secured to said standard, and movable in an arc of a circle parallel with the belt, a pulley carrying head having a slot formed therein, and movable in an arc of a circle transverse to the plane of movement of said arm, clamping means extending through said arm and slot of the head for holding said head in any position of adjustment, and a grooved pulley journaled in said head on an axis transverse to the belt.

5. A belt tightener, comprising a support, two lugs projecting from one face of said support, a pulley carrying head having an arcuate slot for the reception of said lugs, and said head being mounted upon said lugs, a bolt and nut for clamping the head to said support, and a pulley journaled upon said head.

6. A belt tightener, comprising a support formed with a pair of lugs projecting from one face thereof, a pulley carrying head, having a segmental slot formed therein and arranged for the reception of said lugs, clamping means for clamping said head to said support in any position of adjustment, and a grooved pulley journaled upon said head and rotating in a plane at right angles to said segmental slotted portion.

7. A belt tightener and spreader for round, twisted belts, comprising a support, a pulley carrying head mounted on said support and angularly movable with respect thereto, and a grooved pulley journaled in said head, said pulley being arranged to engage the twisted belt at its crossing point, and to one side of the plane thereof, whereby the belt is prevented from rubbing upon itself at the crossing point.

JACOB KAPLAN.